(12) United States Patent
Huang et al.

(10) Patent No.: US 12,400,334 B2
(45) Date of Patent: Aug. 26, 2025

(54) SYSTEM AND METHOD OF CONVOLUTIONAL NEURAL NETWORK

(71) Applicants: TAIWAN SEMICONDUCTOR MANUFACTURING COMPANY, LTD., Hsinchu (TW); NATIONAL TSING HUA UNIVERSITY, Hsinchu (TW)

(72) Inventors: Chao-Tsung Huang, Hsinchu (TW); Kai-Ping Lin, Taichung (TW)

(73) Assignees: TAIWAN SEMICONDUCTOR MANUFACTURING COMPANY, LTD., Hsinchu (TW); NATIONAL TSING HUA UNIVERSITY, Hsinchu (TW)

( * ) Notice: Subject to any disclaimer, the term of this patent is extended or adjusted under 35 U.S.C. 154(b) by 553 days.

(21) Appl. No.: 17/860,750

(22) Filed: Jul. 8, 2022

(65) Prior Publication Data

US 2024/0013400 A1    Jan. 11, 2024

(51) Int. Cl.
*G06K 9/00* (2022.01)
*A61K 35/12* (2015.01)
*G06T 7/174* (2017.01)

(52) U.S. Cl.
CPC .... *G06T 7/174* (2017.01); *G06T 2207/20021* (2013.01); *G06T 2207/20084* (2013.01)

(58) Field of Classification Search
CPC .......... G06K 9/00; G06N 3/045; A61K 35/12; G06T 7/174
USPC ....... 382/100, 103, 156, 168, 181, 194, 199, 382/224, 254, 276, 286, 302, 305; 356/237.5, 213
See application file for complete search history.

(56) References Cited

U.S. PATENT DOCUMENTS

| | | | |
|---|---|---|---|
| 2014/0333923 A1* | 11/2014 | Taniguchi | G01N 21/9505 356/237.5 |
| 2018/0137406 A1* | 5/2018 | Howard | G06N 3/04 |
| 2021/0103793 A1* | 4/2021 | Huang | G06N 3/08 |
| 2023/0017812 A1* | 1/2023 | Lim | G06T 7/90 |
| 2024/0078631 A1* | 3/2024 | Lee | G06T 3/403 |
| 2024/0394905 A1* | 11/2024 | Kuwabara | H04N 7/18 |

OTHER PUBLICATIONS

Tiny image classification using Four-Block convolutional neural network M Sharif, A Kausar, JH Park, DR Shin 2019 International Conference on Information and Communication . . . , 2019•ieeexplore. ieee.org (Year: 2019).*

(Continued)

*Primary Examiner* — Seyed H Azarian
(74) *Attorney, Agent, or Firm* — Maschoff Brennan

(57) ABSTRACT

A method includes: generating, by a processing device, at least one first output image block based on a first image block group; storing stored image blocks corresponding to a first part of the first image block group in the processing device; and after the at least one first output image block is generated, generating, by the processing device, at least one second output image block based on a first image block and the stored image blocks, wherein the first image block group and the first image block are arranged in order along a first direction, and the at least one first output image block and the at least one second output image block are arranged in order along the first direction. A system is also disclosed herein.

20 Claims, 10 Drawing Sheets

(56) References Cited

OTHER PUBLICATIONS

Block-sparse CNN: towards a fast and memory-efficient framework for convolutional neural networks N Wen, R Guo, B He, Y Fan, D Ma Applied Intelligence, 2021•Springer (Year: 2021).*

Huang, C.-T. et al., "eCNN: A Block-Based and Highly-Parallel CNN Accelerator for Edge Inference", MICRO-52, Oct. 12-16, 2019, pp. 182-195.

Tian, Y. et al., "TDAN: Temporally-Deformable Alignment Network for Video Super-Resolution", 2020 IEEE/CVF Conference on Computer Vision and Pattern Recognition (CVPR), pp. 3360-3369.

Claus, M. et al., "ViDeNN: Deep Blind Video Denoising", IEEE/CVF Conference on Computer Vision and Pattern Recognition Workshops (CVPRW), Apr. 24, 2019.

Li, S. et al., "3D-DETNet: a single stage video-based vehicle detector", Proc. SPIE 10828, Third International Workshop on Pattern Recognition, 2018, 108280A.

* cited by examiner

SYSTEM AND METHOD OF CONVOLUTIONAL NEURAL NETWORK

BACKGROUND

In deep learning, a convolutional neural network (CNN) is a class of artificial neural network, most commonly applied to analyze visual imagery. A CNN modeling process is performed to input images to generate corresponding output images. A chip receives the input images from a dynamic random-access memory (DRAM) for performing the CNN modeling process. As the size of the input images increases, a required DRAM bandwidth is increased.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
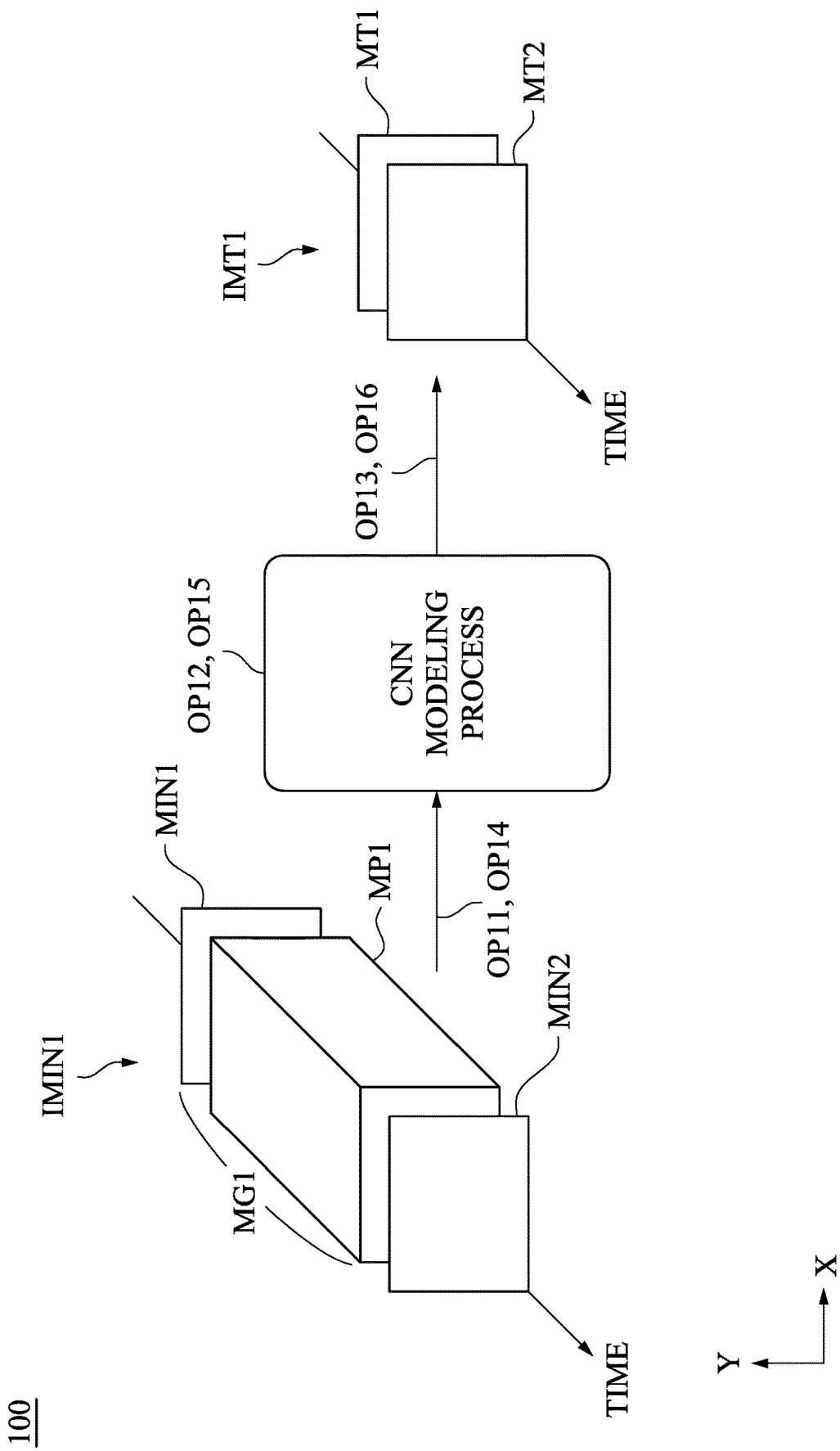
FIG. 1 is a schematic diagram of a convolutional neural network (CNN) process, in accordance with some embodiments of the present disclosure.

The following disclosure provides many different embodiments, or examples, for implementing different features of the provided subject matter. Specific examples of components, materials, values, steps, arrangements or the like are described below to simplify the present disclosure. These are, of course, merely examples and are not intended to be limiting. Other components, materials, values, steps, arrangements or the like are contemplated. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The device may be otherwise oriented (rotated 90 degrees or at other orientations) and the spatially relative descriptors used herein may likewise be interpreted accordingly. The term mask, photolithographic mask, photomask and reticle are used to refer to the same item.

The terms applied throughout the following descriptions and claims generally have their ordinary meanings clearly established in the art or in the specific context where each term is used. Those of ordinary skill in the art will appreciate that a component or process may be referred to by different names. Numerous different embodiments detailed in this specification are illustrative only, and in no way limits the scope and spirit of the disclosure or of any exemplified term.

It is worth noting that the terms such as "first" and "second" used herein to describe various elements or processes aim to distinguish one element or process from another. However, the elements, processes and the sequences thereof should not be limited by these terms. For example, a first element could be termed as a second element, and a second element could be similarly termed as a first element without departing from the scope of the present disclosure.

In the following discussion and in the claims, the terms "comprising," "including," "containing," "having," "involving," and the like are to be understood to be open-ended, that is, to be construed as including but not limited to. As used herein, instead of being mutually exclusive, the term "and/or" includes any of the associated listed items and all combinations of one or more of the associated listed items.

FIG. 1 is a schematic diagram of a convolutional neural network (CNN) process 100, in accordance with some embodiments of the present disclosure. In some embodiments, the process 100 includes operations OP11-OP16 performed in order. As illustratively shown in FIG. 1, the operations OP11-OP16 are performed to generate the output images IMT1 based on the input images IMIN1.

In some embodiments, the input images IMIN1 includes an image group MG1 and an input image MIN2. The image group MG1 includes an input image MIN1 and an image group part MP1. As illustratively shown in FIG. 1, the image group MG1 and the input image MIN2 are arranged in order along a first direction, such as the time direction shown in FIG. 1. The input image MIN1 and the image group part MP1 are arranged in order along the time direction. In some embodiments, the image group MG1 includes multiple input images (not shown in FIG. 1) arranged in order along the time direction.

In some embodiments, the output images IMT1 includes output images MT1 and MT2. As illustratively shown in FIG. 1, the output images MT1 and MT2 are arranged in order along a first direction. In some embodiments, each of the output images MT1, MT2 and the input images IMIN1, IMIN2 is extend along a second direction and/or a third direction different from the first direction, such as an X-direction and/or a Y-direction shown in FIG. 1. In some alternative embodiments, the first direction corresponds to a space direction, such as a Z-direction (not shown in figures) different from the X-direction and the Y-direction.

Figure 7:
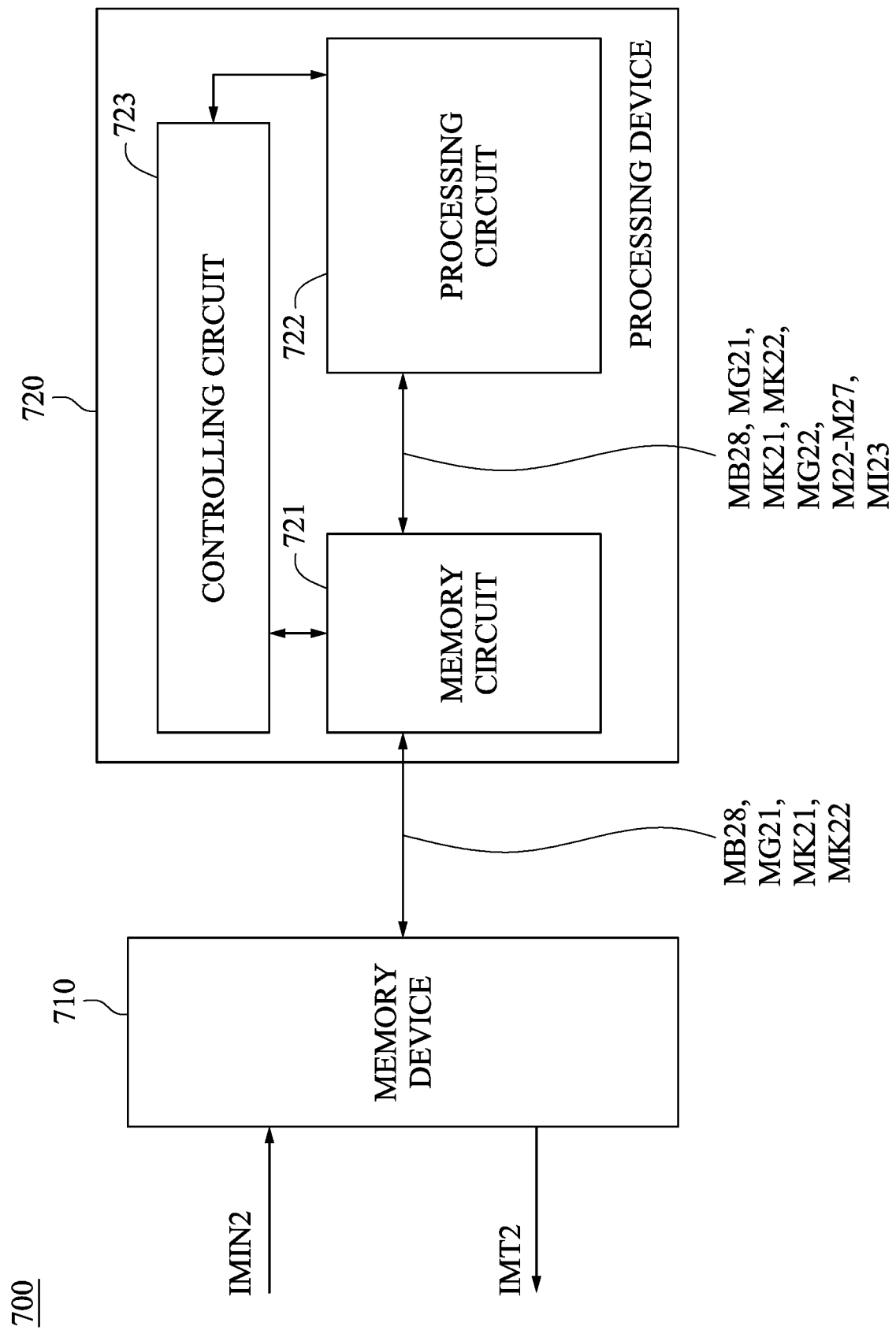
FIG. 7 is a schematic diagram of a system configured to perform the methods and the process shown in FIG. 1 to FIG. 5, in accordance with some embodiments of the present disclosure.

At the operation OP11, the image group MG1 is received by a processing device, such as the processing device 720 shown in FIG. 7. At the operation OP12, a CNN modeling process is performed to the image group MG1, to generate the output image MT1, and the image group part MP1 is stored in the processing device. At the operation OP13, the output image MT1 is outputted by the processing device.

At the operation OP14, the input image MIN2 is received by a processing device. At the operation OP15, a CNN modeling process is performed to the input image MIN2 and the image group part MP1 stored in the processing device, to generate the output image MT2. At the operation OP16, the output image MT2 is outputted by the processing device.

In some approaches, a first image group is received, by a processing device, to generate a first output image. Then, a second image group is received, by the processing device, to generate a first output image. A large amount of image groups needs to be received by the processing device for generating multiple output images, such that a huge dynamic random-access memory (DRAM) bandwidth is required.

Compared to the above approaches, in some embodiments of the present disclosure, during the operations OP11-OP13 for generating the output image MT1, the image group part MP1 is stored in the processing device. Accordingly, the processing device receives the input image MIN2, and performs the CNN modeling process to the input image MIN2 and the image group part MP1 already stored, to generate the output image MT2 at the operation OP15. As a result, a required DRAM bandwidth is reduced.

Figure 2A:
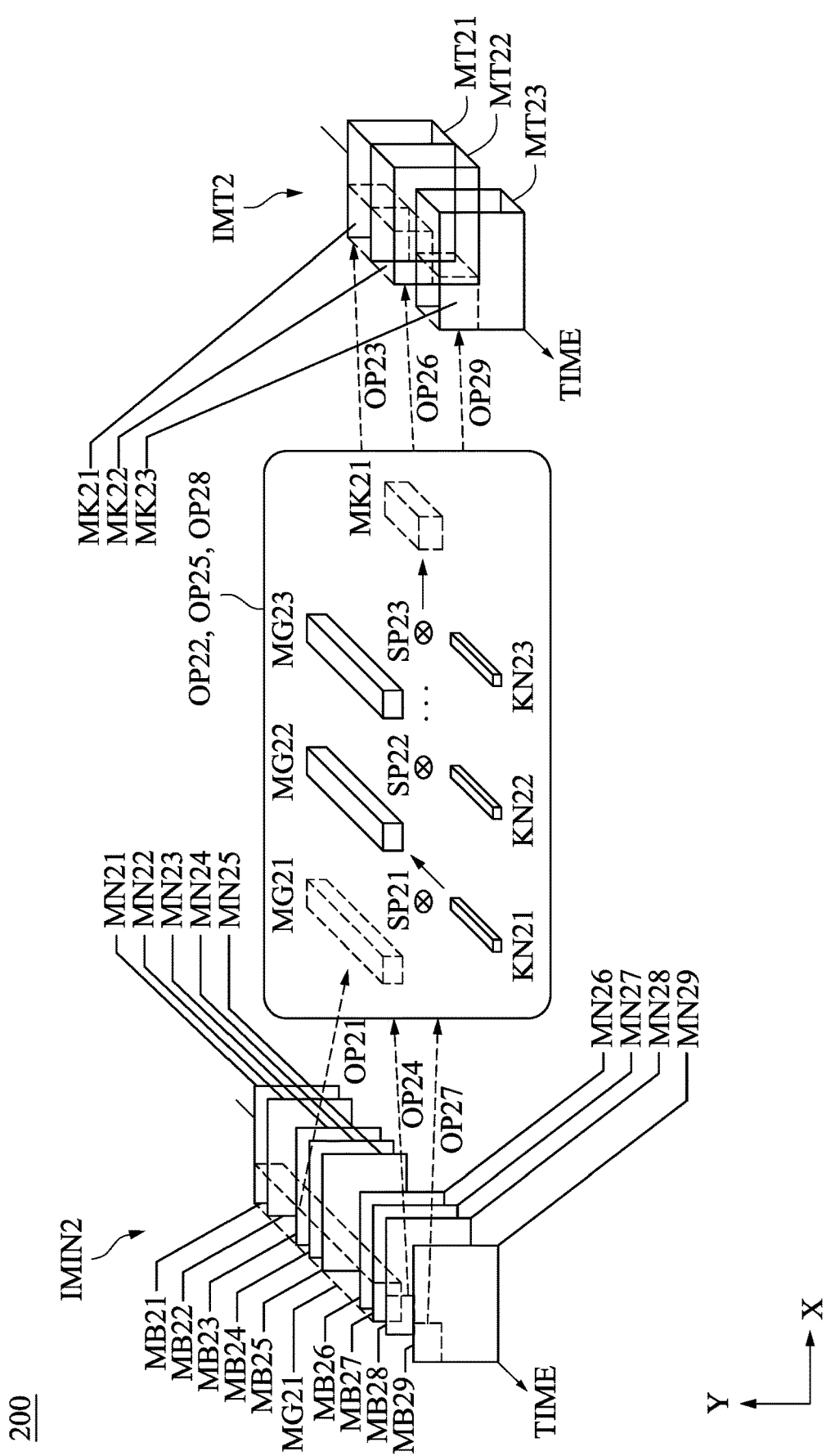
FIG. 2A is a schematic diagram of a CNN process corresponding to the process shown in FIG. 1, in accordance with some embodiments of the present disclosure.

FIG. 2A is a schematic diagram of a CNN process 200 corresponding to the process 100 shown in FIG. 1, in accordance with some embodiments of the present disclosure. In some embodiments, the process 200 includes operations OP21-OP29 performed in order. As illustratively shown in FIG. 2A, the operations OP21-OP29 are performed to generate output images IMT2 based on input images IMIN2.

In some embodiments, the input images IMIN2 includes input images MN21-MN29. As illustratively shown in FIG. 2A, the input images MN21-MN29 are arranged in order along the time direction. Each of the input images MN21-MN29 is divided into multiple image blocks. The input images MN21-MN29 include image blocks MB21-MB29, respectively. In some embodiments, the image blocks MB21-MB27 forms an image block group MG21. Alternatively stated, the image block group MG21 includes the image blocks MB21-MB27. In some embodiments, each of the input images MN21-MN29 extends along the X-direction and the Y-direction.

In some embodiments, the output images IMT2 includes output images MT21-MT23. As illustratively shown in FIG. 2A, the output images MT21-MT23 are arranged in order along the time direction. Each of the output images MT21-MT23 is divided into multiple output image blocks. The output images MT21-MT23 include output image blocks MK21-MK23, respectively. In various embodiments, each of the output images MT21-MT23 corresponds to one or more output images. In some embodiments, each of the output images MT21-MT23 extends along the X-direction and the Y-direction.

Referring to FIG. 2A and FIG. 1, the process 200 is an embodiment of the process 100. The image block group MG21 corresponds to the image group MG1, the image blocks MB28 and MB29 correspond to the input image MIN2. The image blocks MB21 and MB22 correspond to the input image MIN1. The output images MT21-MT23 correspond to the output images MT1 and MT2. The operations OP21-OP23 correspond to the operations OP11-OP13, respectively. The operations OP24, OP27 correspond to the operation OP14. The operations OP25, OP28 correspond to the operation OP15. The operations OP26, OP29 correspond to the operation OP16. Therefore, some descriptions are not repeated for brevity.

At the operation OP21, the image block group MG21 is received by the processing device. At the operation OP22, a first CNN modeling process is performed to the image block group MG21, to generate the output image block MK21. In some embodiments, a part of the image block group MG21 is stored in the processing device at the operation OP22. For example, the image blocks MB22-MB27 are stored in the processing device. At the operation OP13, the output image block MK21 is outputted by the processing device.

In some embodiments, the operation OP22 includes operations SP21-SP23. As illustratively shown in FIG. 2A, the operations SP21-SP23 are performed in order. At the operation SP21, a convolution calculation is performed with a kernel KN21 and the image block group MG21, to generate an intermediate image block group MG22. At the operation SP22, a convolution calculation is performed with a kernel KN22 and the intermediate image block group MG22, to generate another intermediate image block group. At the operation SP23, a convolution calculation is performed with a kernel KN23 and an intermediate image block group MG23, to generate the output image block MK21.

In some embodiments, one or more convolution calculations are performed between the operations SP22 and SP23, to generate the intermediate image block group MG23. In various embodiments, various numbers of convolution calculations are performed with various numbers of kernels (not shown in FIG. 2A), to generate various numbers of intermediate image block groups.

At the operation OP24, the image block MB28 is received by the processing device. At the operation OP25, a second CNN modeling process is performed to the image block MB28 and the image blocks MB22-MB27 already stored in the processing device, to generate the output image block MK22. At the operation OP26, the output image block MK22 is outputted by the processing device.

In some embodiments, the image block MB28 is stored in the processing device at the operation OP25. In some embodiments, at the operation OP25, convolution calculations are performed with the image blocks MB22-MB28 and at least the kernels KN21-KN23, and one or more intermediate image block groups corresponding to the image blocks MB22-MB28 are generated by the convolution calculations.

At the operation OP27, the image block MB29 is received by the processing device. At the operation OP28, a second CNN modeling process is performed to the image block MB29 and the image blocks MB23-MB28 already stored in the processing device, to generate the output image block MK22. At the operation OP29, the output image block MK23 is outputted by the processing device.

In some embodiments, the image block MB29 is stored in the processing device at the operation OP28. In some embodiments, at the operation OP28, convolution calculations are performed with the image blocks MB23-MB29 and at least the kernels KN21-KN23, and one or more intermediate image block groups corresponding to the image blocks MB23-MB29 are generated by the convolution calculations.

In some embodiments, the input images IMIN2 further includes one or more input images (not shown in FIG. 2A) between the input images MN28 and MN29, and the one or more input images are also divided into multiple image blocks. In such embodiments, operations similar with the operations OP24-OP26 are performed between the operations OP26 and OP27 to the image blocks with a part of the image block group MG21, to generate one or more output image block between the output image blocks MK22 and MK23.

Figure 2B:
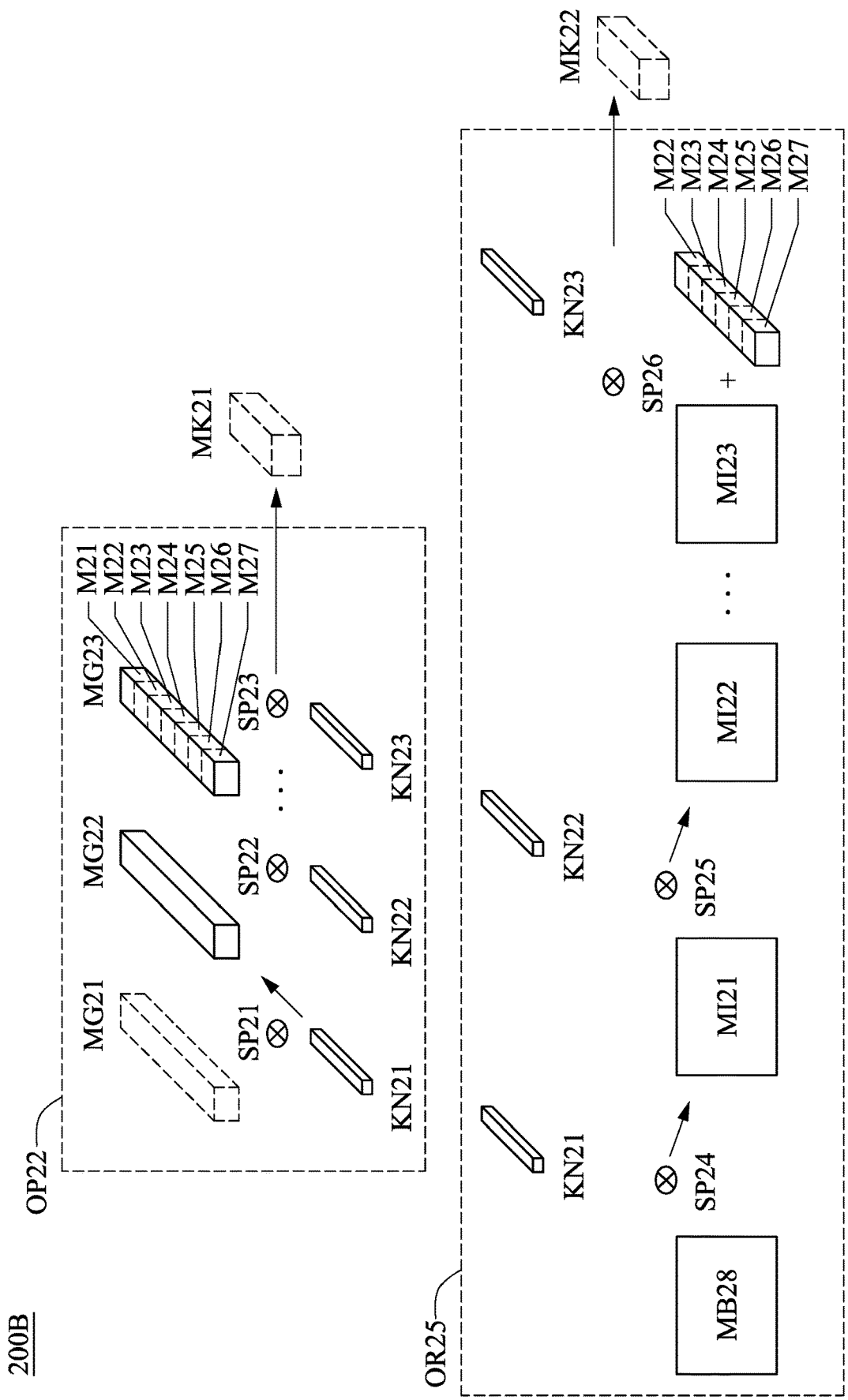
FIG. 2B is a schematic diagram of a CNN process corresponding to the process shown in FIG. 2A, in accordance with some embodiments of the present disclosure.

FIG. 2B is a schematic diagram of a CNN process 200B corresponding to the process 200 shown in FIG. 2A, in accordance with some embodiments of the present disclosure. Referring to FIG. 2A and FIG. 2B, the process 200B is an alternative embodiment of the process 200. FIG. 2B follows a similar labeling convention to that of FIG. 2A. For brevity, the discussion will focus more on differences between FIG. 2A and FIG. 2B than on similarities.

In the embodiment shown in FIG. 2B, the intermediate image block group MG23 includes image blocks M21-M27 arranged in order along the time direction. Referring to FIG. 2A and FIG. 2B, the image blocks M21-M27 correspond to the image blocks MB21-MB27, respectively. In some embodiments, during the operation OP22, the image blocks M21-M27 are stored in the processing device.

Referring to FIG. 2A and FIG. 2B, instead of the operation OP25, the process 200B includes an operation OR25 for generating the output image block MK22. Before the operation OR25, the image block MB28 is received by the processing device. At the operation OR25, CNN modeling process is performed to the image block MB28 and the stored the image blocks M21-M27, to generate the output image block MK22.

In some embodiments, the operation OR25 includes operations SP24-SP26. As illustratively shown in FIG. 2B, the operations SP24-SP26 are performed in order. At the operation SP24, a convolution calculation is performed with the kernel KN21 and the image block MB28, to generate an intermediate image block MI21. At the operation SP25, a convolution calculation is performed with the kernel KN22 and the intermediate image block MI21, to generate an intermediate image block MI22. At the operation SP26, a convolution calculation is performed with the kernel KN23, an intermediate image block MI23 and the stored image blocks M22-M27, to generate the output image block MK22.

In some embodiments, one or more convolution calculations are performed between the operations SP24 and SP25, to generate the intermediate image block MI23 based on the intermediate image block MI22. In various embodiments, various numbers of convolution calculations are performed with various numbers of kernels (not shown in FIG. 2B), to generate various numbers of intermediate image blocks.

In some embodiments, at the operation OR25, the intermediate image block MI23 is stored in the processing device. After the operation OR25, a CNN modeling process is performed with kernels KN21-KN23, the image block MB29 and the stored image blocks MI23, M23-M27, to generate the output image block MK23 shown in FIG. 2A.

Figure 3:
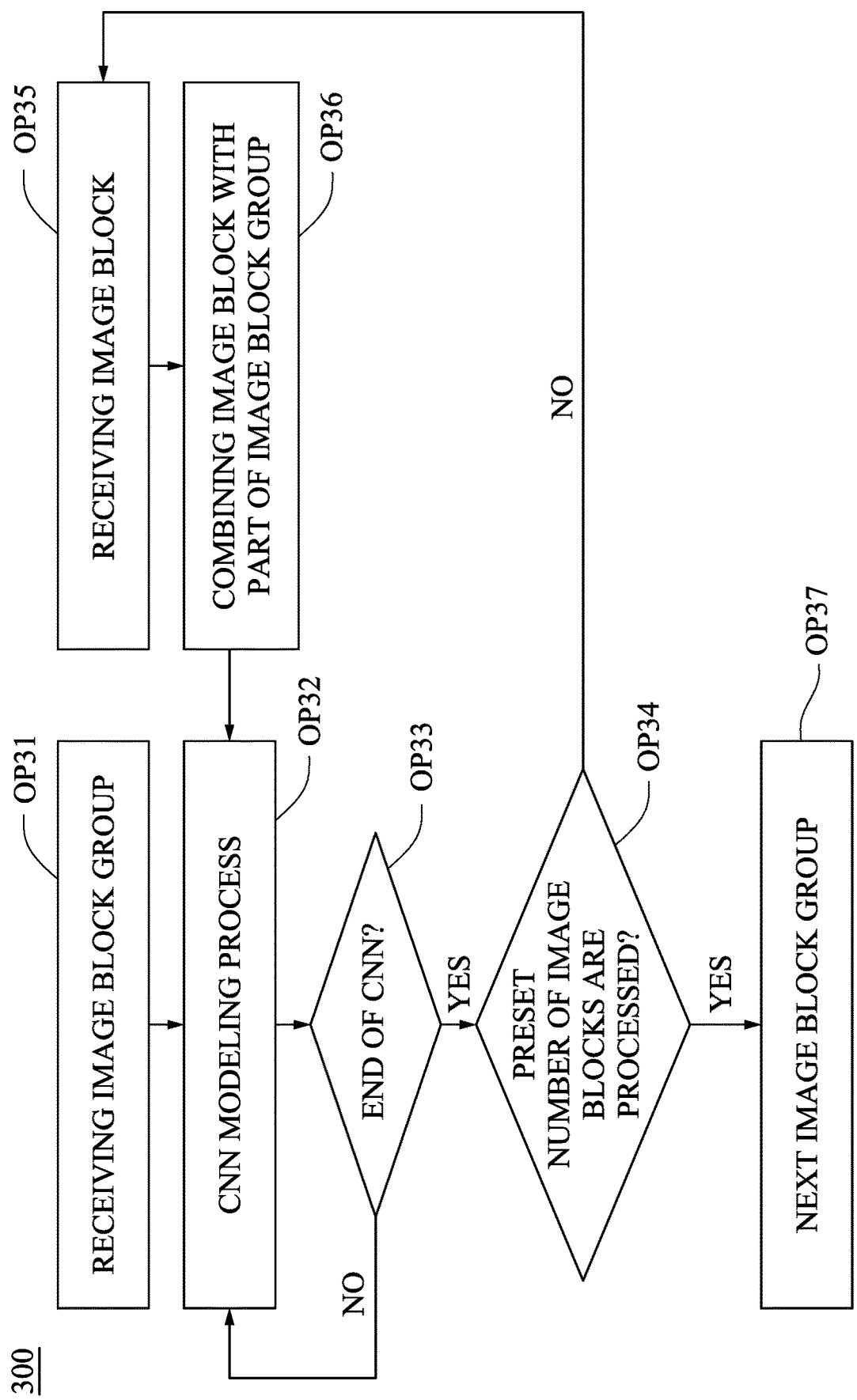
FIG. 3 is a flowchart of a method, corresponding to the process as shown in FIG. 2A, in accordance with some embodiments of the present disclosure.

FIG. 3 is a flowchart of a method 300, corresponding to the process 200 as shown in FIG. 2A, in accordance with some embodiments of the present disclosure. As illustratively shown in FIG. 3, the method 300 includes operations OP31-OP37.

Referring to FIG. 2A and FIG. 3, operations of the process 200 and the method 300 are similar. The operation OP21 corresponds to the operation OP31. The operations OP22, OP25 and OP28 correspond to the operations OP32 and OP33. The operations OP24 and OP27 correspond to the operation OP35. Therefore, some descriptions are not repeated for brevity.

At the operation OP31, an image block group, such as the image block group MG21 shown in FIG. 2A, is received, for performing a CNN modeling process. At the operation OP32, the CNN modeling process is performed with the received image block group. For example, one of the operations SP21-SP23 shown in FIG. 2A is performed at the operation OP32.

At the operation OP33, a controlling circuit, such as a controlling circuit 723 shown in FIG. 7, is configured to determine whether the CNN modeling process is end. In response to the CNN modeling process being end, the operation OP34 is performed. In response to the CNN modeling process not being end, the operation OP32 is performed again.

For example, the controlling circuit determines whether the operation OP22 is end based on whether the output image block MK21 is generated. In response to the output image block MK21 being generated, the operation OP34 is performed. In response to the output image block MK21 not being generated, the operation OP32 is performed again, until the output image block MK21 is generated.

For further example, referring to FIG. 3 and FIG. 2A, in response to the operation SP21 being performed and the operation SP23 not being performed, the controlling circuit determines the CNN modeling process not being end, and the operation OP32 is performed again with the kernel KN22. In response to the operation SP23 being performed, the controlling circuit determines the CNN modeling process being end, and the operation OP34 is performed.

At the operation OP34, the controlling circuit is configured to determine whether a preset number of image blocks are processed by the CNN modeling process of the operation OP32. In response to the preset number of image blocks being processed by the CNN modeling process, the operation OP37 is performed. In response to at least one of the preset number of the image blocks not being processed by the CNN modeling process, the operation OP35 is performed.

For example, in some embodiments corresponding to FIG. 2A, the preset number is three and the preset number of the image blocks are the image blocks MB27-MB29. In response to the operations OP21-OP26 being performed and the operations OP27-OP29 not being performed, such that the image blocks MB27-MB28 are processed by the CNN modeling process and the image block MB29 is not processed, the operation OP35 is performed to receive and process the image block MB29. In response to the operations OP21-OP29 being performed, such that the image blocks MB27-MB29 are processed by the CNN modeling process, the operation OP37 is performed.

In some embodiments, the preset number is associated with hardware specifications of a system performing the process 300. For example, referring to FIG. 7, the preset number is associated with a data transmission bandwidth between a memory device 710 and the processing device 720, and/or a processing speed of the processing device 720.

At the operation OP35, an image block, such as the image block MB28 or MB29 shown in FIG. 2A, is received. At the operation OP36, the received image block is combined with a part of the received image block group. After the operation OP36, the operation OP32 is performed again with the received image block and the part of the received image block group.

For example, at the operation OP35, the image block MB28 is received by the processing device. At the operation OP36, the image block MB28 is combined with the image blocks MB22-MB27, which is a part of the image block group MG21. In some embodiments corresponding to FIG. 2B, at the operation OP36, the image block MB28 is combined with the image blocks M22-M27, which is a part of the image block group MG23. After the operation OP36, the operation OP32 is performed to the image blocks MB22-MB28.

At the operation OP37, a next image block group and next image blocks, which are similar with the image block group MG21 and the image blocks MB27, MB28, are processed. Further details of the next image block group and the next image blocks are described below with the embodiments associated with the FIG. 4 and FIG. 5.

Figure 4:
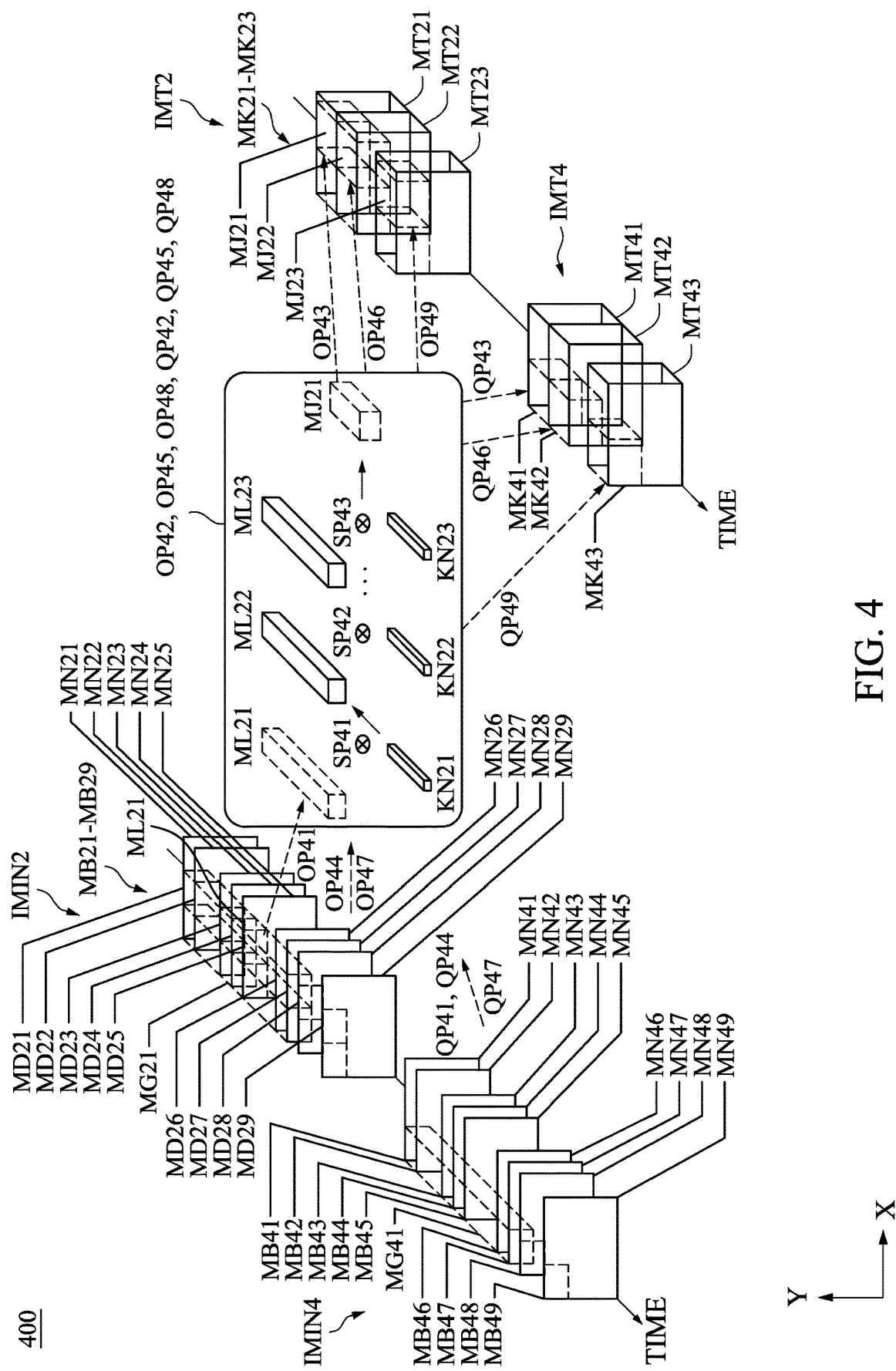
FIG. 4 is a schematic diagram of a CNN process corresponding to the process shown in FIG. 2A, in accordance with some embodiments of the present disclosure.

FIG. 4 is a schematic diagram of a CNN process 400 corresponding to the process 200 shown in FIG. 2A, in accordance with some embodiments of the present disclosure. In some embodiments, the process 400 includes the operations OP41-OP49 and QP41-QP49 performed in order.

As illustratively shown in FIG. 4, the operations OP41-OP49 are performed to generate the output images IMT2 based on the input images IMIN2, and the operations QP41-QP49 are performed to generate output images IMT4 based on input images IMIN4. The input images IMIN2 and IMIN4 are arranged in order along the time direction, and the output images IMT2 and IMT4 are arranged in order along the time direction.

In some embodiments, the input images IMIN4 includes the input images MN41-MN49. As illustratively shown in FIG. 4, the input images MN41-MN49 are arranged in order along the time direction. Each of the input images MN41-MN49 is divided into multiple image blocks. The input images MN41-MN49 include image blocks MB41-MB49, respectively. In some embodiments, the image blocks MB41-MB47 forms an image block group MG41. Alternatively stated, the image block group MG41 includes the image blocks MB41-MB47. In some embodiments, each of the input images MN41-MN49 extends along the X-direction and the Y-direction.

In some embodiments, the output images IMT4 includes output images MT41-MT43. As illustratively shown in FIG. 4, the output images MT41-MT43 are arranged in order along the time direction. Each of the output images MT41-MT43 is divided into multiple output image blocks. The output images MT41-MT43 include output image blocks MK41-MK43, respectively. In various embodiments, each of the output images MT41-MT43 corresponds to one or more output images. In some embodiments, each of the output images MT41-MT43 extends along the X-direction and the Y-direction.

Referring to FIG. 4 and FIG. 2A, the process 400 is an alternative embodiment of the process 200. FIG. 4 follows a similar labeling convention to that of FIG. 2A. For brevity, the discussion will focus more on differences between FIG. 2A and FIG. 4 than on similarities. In some embodiment, the operations OP41-OP49 corresponding to the image block group ML21 are performed after the operations OP21-OP29 corresponding to the image block group MG21 are performed. The operations QP41-QP49 corresponding to the input images IMIN4 are performed after the operations OP21-OP29 and OP41-OP49 corresponding to the input images IMIN2 are performed.

Referring to FIG. 4 and FIG. 2A, the operations of the process 400 are similar with the operations of the process 200. The operations OP41-OP49 corresponding to the image block group ML21 are similar with the operations OP21-OP29 corresponding to the image block group MG21, respectively. The operations QP41-QP49 corresponding to the input images IMIN4 are similar with the operations OP21-OP29 corresponding to the input images IMIN2, respectively. Therefore, some descriptions are not repeated for brevity.

Referring to FIG. 4 and FIG. 2A, the input images MN21-MN29 further include image blocks MD21-MD29, respectively. In some embodiments, the image blocks MD21-MD27 forms an image block group ML21. Alternatively stated, the image block group ML21 includes the image blocks MD21-MD27. As illustratively shown in FIG. 4, for an integer number i larger than 0 and smaller than 10, the image blocks MB2$i$ and MD2$i$ are arranged in order along the X-direction, and are located on the input image MN2$i$. In some embodiments, the image block groups MG21 and ML21 are arranged in order along the X-direction.

Referring to FIG. 4 and FIG. 2A, the output images MT21-MT23 further include image blocks MJ21-MJ23, respectively. As illustratively shown in FIG. 4, for an integer number j larger than 0 and smaller than 4, the image blocks MJ2$j$ and MJ2$j$ are arranged in order along the X-direction, and are located on the output image MT2$j$.

At the operation OP41, the image block group ML21 is received by the processing device. At the operation OP42, a fourth CNN modeling process is performed to the image block group ML21, to generate the output image block MJ21. In some embodiments, a part of the image block group ML21 is stored in the processing device at the operation OP42. For example, the image blocks MD22-MD27 are stored in the processing device. At the operation OP43, the output image block MJ21 is outputted by the processing device.

In some embodiments, the operation OP42 includes operations SP41-SP43. As illustratively shown in FIG. 4, the operations SP41-SP43 are performed in order. At the operation SP41, a convolution calculation is performed with a kernel KN21 and the image block group ML21, to generate an intermediate image block group ML22. At the operation SP42, a convolution calculation is performed with a kernel KN22 and the intermediate image block group ML22, to generate another intermediate image block group. At the operation SP43, a convolution calculation is performed with a kernel KN23 and the intermediate image block group ML23, to generate the output image block MJ21.

In some embodiments, one or more convolution calculations are performed between the operations SP42 and SP43, to generate the intermediate image block group ML23. In various embodiments, various numbers of convolution calculations are performed with various numbers of kernels (not shown in FIG. 4), to generate various numbers of intermediate image block groups.

At the operation OP44, the image block MD28 is received by the processing device. At the operation OP45, a fifth CNN modeling process is performed to the image block MD28 and the image blocks MD22-MD27 already stored in the processing device, to generate the output image block MJ22. At the operation OP46, the output image block MJ22 is outputted by the processing device.

In some embodiments, the image block MD28 is stored in the processing device at the operation OP45. In some embodiments, at the operation OP45, convolution calculations are performed with the image blocks MD22-MD28 and at least the kernels KN21-KN23, and one or more intermediate image block groups corresponding to the image blocks MD22-MD28 are generated by the convolution calculations.

At the operation OP47, the image block MD29 is received by the processing device. At the operation OP48, a sixth CNN modeling process is performed to the image block MD29 and the image blocks MD23-MD28 already stored in the processing device, to generate the output image block MJ23. At the operation OP49, the output image block MJ23 is outputted by the processing device.

In some embodiments, the image block MD29 is stored in the processing device at the operation OP48. In some embodiments, at the operation OP48, convolution calculations are performed with the image blocks MD23-MD29 and at least the kernels KN21-KN23, and one or more intermediate image block groups corresponding to the image blocks MD23-MD29 are generated by the convolution calculations.

In some embodiments, after the operation OP49, other image block groups of the input images IMIN2 and other image blocks of the input images IMIN2 are processed by operations similar with the operations OP41-OP49, to generate other output image blocks of the output images IMT2. In some embodiments, after every image block of each of the input images IMIN2 are processed to generate entire of each of the output images IMT2, the operations QP41-QP49 are performed to process the next input images IMIN4.

At the operation QP41, the image block group MG41 is received by the processing device. At the operation QP42, a seventh CNN modeling process is performed to the image block group MG41 with at least the kernels KN21-KN23, to generate the output image block MK41. In some embodiments, a part of the image block group MG41 is stored in the processing device at the operation QP42. For example, the image blocks MB22-MB27 are stored in the processing device. At the operation QP43, the output image block MK41 is outputted by the processing device.

At the operation QP44, the image block MB48 is received by the processing device. At the operation QP45, a eighth CNN modeling process is performed to the image block MB48 and the image blocks MB42-MB47 already stored in the processing device, to generate the output image block MK42. At the operation QP46, the output image block MK42 is outputted by the processing device.

In some embodiments, the image block MB48 is stored in the processing device at the operation QP45. In some embodiments, at the operation QP45, convolution calculations are performed with the image blocks MB42-MB48 and at least the kernels KN21-KN23, and one or more intermediate image block groups corresponding to the image blocks MB42-MB48 are generated by the convolution calculations.

At the operation QP47, the image block MB49 is received by the processing device. At the operation QP48, a ninth CNN modeling process is performed to the image block MB49 and the image blocks MB43-MB48 already stored in the processing device, to generate the output image block MK43. At the operation QP49, the output image block MK43 is outputted by the processing device.

In some embodiments, the image block MB49 is stored in the processing device at the operation QP48. In some embodiments, at the operation QP48, convolution calculations are performed with the image blocks MB43-MB49 and at least the kernels KN21-KN23, and one or more intermediate image block groups corresponding to the image blocks MB43-MB49 are generated by the convolution calculations.

Figure 5:
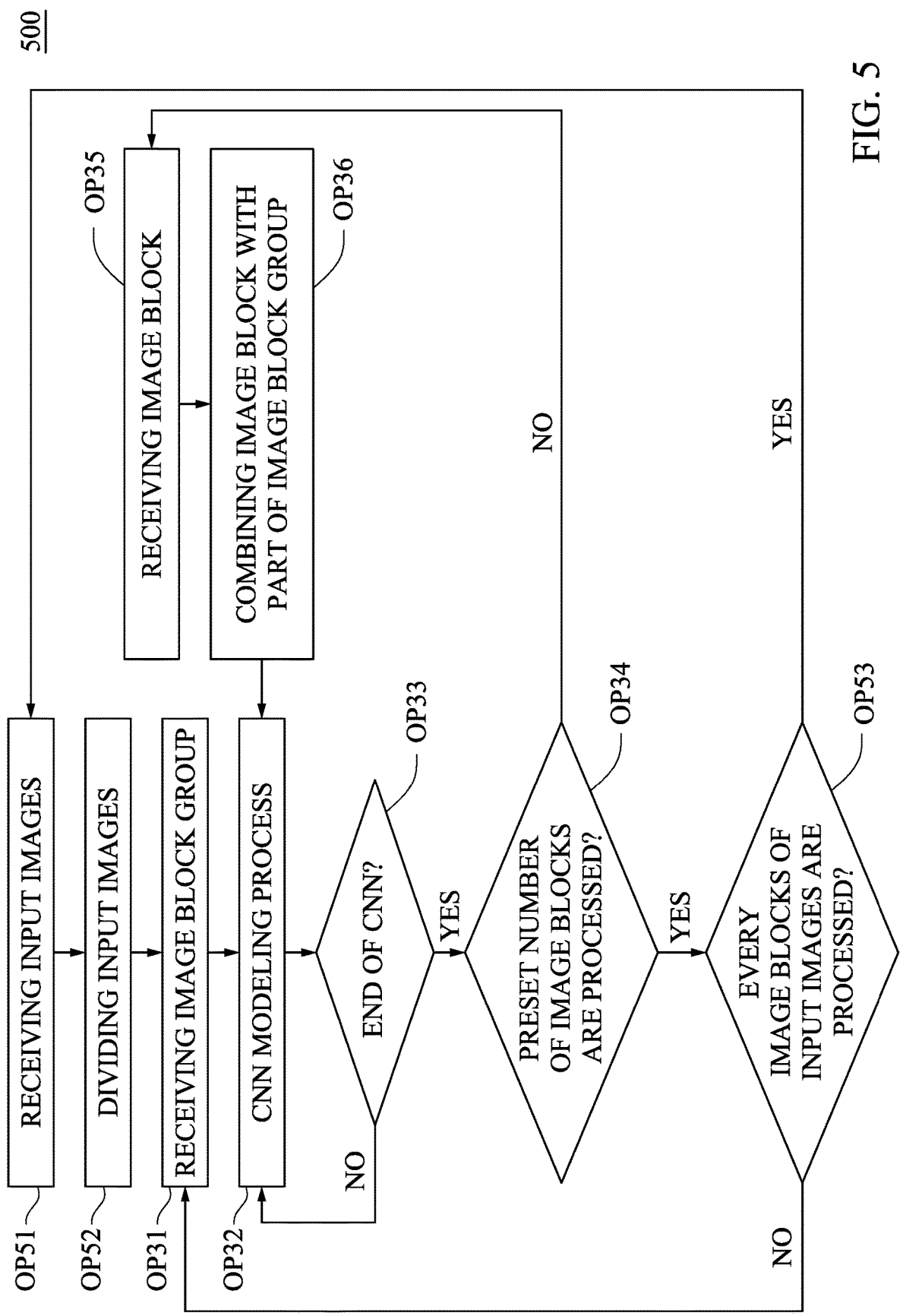
FIG. 5 is a flowchart of a method, corresponding to the process as shown in FIG. 4, in accordance with some embodiments of the present disclosure.

FIG. 5 is a flowchart of a method 500, corresponding to the process 400 as shown in FIG. 4, in accordance with some embodiments of the present disclosure. As illustratively shown in FIG. 5, the method 500 includes operations OP31-OP36 and OP51-OP57.

Referring to FIG. 5 and FIG. 3, the method 500 is an alternative embodiment of the method 300. FIG. 5 follows a similar labeling convention to that of FIG. 3. Details of the operations OP31-OP36 are described above with the embodiments associated with FIG. 3. For brevity, the discussion will focus more on differences between FIG. 3 and FIG. 5 than on similarities.

At the operation OP51, input images, such as the input images IMIN2 shown in FIG. 4, is received. At the operation OP52, the received input images are divided into multiple image block groups and multiple image blocks. For example, the input images IMIN2 are divided into at least the image groups MG21, ML21 and the image blocks MB28, MB29, MD28, MD29.

After the operation OP52, the operations OP31-OP36 are performed with an image block group and corresponding image blocks to generate corresponding output image blocks. For example, the operations OP31-OP36 are performed with the image block group MG21 and the corresponding image blocks MB28 and MB29 to generate the output image blocks MK21-MK23.

After the operations OP31-OP36 are performed by the preset number of times, the operation OP53 is performed. Referring to FIG. 5 and FIG. 3, the operation OP53 correspond to the operation OP37. At the operation OP53, the controlling circuit is configured to determine whether entire of the input images received at the operation OP51 are processed by the CNN modeling process of the operation OP32. In response to the entire of the input images received at the operation OP51 being processed, the operation OP51 is performed again to receive other input images. In response to a part of the input images received at the operation OP51 not being processed, the operation OP31 is performed again to receive another image block group and corresponding image blocks.

For example, at the operation OP53, the controlling circuit determines whether every image blocks of the input images IMIN2 are processed. In response to every image block of the input images IMIN2 being processed, the operation OP51 is performed to receive the input images IMIN4. In response to a part of the input images IMIN2, such as the image block group ML21 and the image blocks MD28, MD29, not being processed, the operation OP31 is performed again to receive and process the image block group ML21 and the image blocks MD28, MD29.

Figure 6:
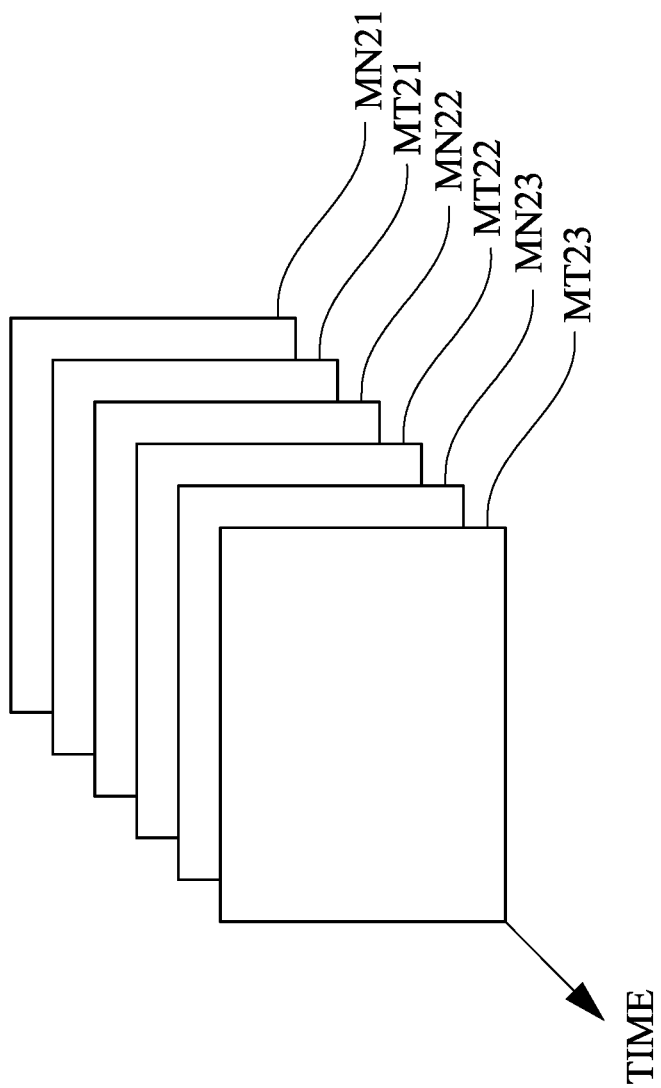
FIG. 6 is a schematic diagram of a process associated with the input images and the output images shown in FIG. 2A and FIG. 4, in accordance with some embodiments of the present disclosure.

FIG. 6 is a schematic diagram of a process 600 associated with the input images MN21-MN23 and the output images MT21-MT23 shown in FIG. 2A and FIG. 4, in accordance with some embodiments of the present disclosure. In some embodiments, the process 600 is performed to display the input image MN21, the output image MT21, the input image MN22, the output image MT22, the input image MN23 and the output image MT23 in order. In some embodiments, the process 600 is performed by a displayer (not shown in FIG. 6).

As illustratively shown in FIG. 6, the input image MN21, the output image MT21, the input image MN22, the output image MT22, the input image MN23 and the output image MT23 are arranged in order along the time direction. In some embodiments, the input images MN21-MN23 correspond to odd number frames of a film, and the output images MT21-MT23 correspond to even number frames of the film.

FIG. 7 is a schematic diagram of a system 700 configured to perform the methods 300, 500 and the process 100, 200, 400 shown in FIG. 1 to FIG. 5, in accordance with some embodiments of the present disclosure. In some embodiments, the system 700 includes a memory device 710 and a processing device 720.

In some embodiments, the memory device 710 is implemented as a DRAM storage, and the processing device 720 is implemented as a chip including a central processing unit (CPU), a graphic processing unit (GPU), a Field Programmable Gate Array (FPGA) and/or a network processing unit (NPU). In some embodiments, the processing device 720 is separated from the memory device 710. In other words, the memory device 710 is implemented by an off-chip memory. In some embodiments, the transmission between the memory device 710 and the processing device 720 corresponds to a DRAM bandwidth.

As illustratively shown in FIG. 7, the memory device 710 is configured to receive multiple input images, such as the input images IMIN2 and IMIN4 shown in FIG. 4, and output multiple output images, such as the output images IMT2 and IMT4 shown in FIG. 4. The processing device 720 is configured to divide the input images into multiple image block groups and multiple image blocks, and receive the multiple image block groups and the multiple image blocks. Referring to FIG. 5 and FIG. 7, the operation OP51 is performed by the memory device 710.

For example, the processing device 720 divides the input images IMIN2 into at least the image block groups MG21, ML21 and the image blocks MB28, MB29, MD28, MD29, and receive the image block group MG21, the image blocks MB28, MB29, the image block group ML21, and the image blocks MD28, MD29 in order. In some embodiments, the processing device 720 further divides the input images IMIN4 into at least the image block group MG41 and the image blocks MB48, MB49. Referring to FIG. 1 to FIG. 5 and FIG. 7, the processes 100, 200, 400, the method 300 and the operations OP52-OP53 are performed by the processing device 720.

In some embodiments, the processing device 720 includes a memory circuit 721, the processing circuit 722 and the controlling circuit 723. In some embodiments, the memory circuit 721 is configured to store the image block groups and the image blocks, such as the image block groups MG21, ML21 and the image blocks MB28, MB29, MD28, MD29. In some embodiments, the memory circuit 721 is further configured to store at least a part of the intermediate image blocks, such as the intermediate image blocks M21-M27 and MI23 shown in FIG. 2B. In some embodiments, the memory circuit 721 is implemented by an on-chip memory.

In some embodiments, the processing circuit 722 is configured to receive one of the image block groups and the corresponding image blocks in order from the memory circuit 721, and perform to CNN modeling processes to the one of the image block groups and the corresponding image blocks, to generate corresponding output image blocks.

For example, the processing circuit 722 receives the image block group MG21 from the memory circuit 721 to generate the output image block MK21, and receives a part of the image block group MG21 and the image block MB28 from the memory circuit 721 to generate the output image block MK22. For further example, the processing circuit 722 receives the image blocks MB23-MB29 from the memory circuit 721 to generate the output image block MK23.

In some embodiments, the processing circuit 722 receives the intermediate image blocks M22-M27 and the image block MB28 from the memory circuit 721 to generate the output image block MK22. In some embodiments, the processing circuit 722 receives the intermediate image blocks M23-M27 and MI23 from the memory circuit 721 to generate the output image block MK23.

In some embodiments, the memory circuit 721 is further configured to store the intermediate image blocks of the CNN modeling processes, such as the intermediate image blocks MG22, MG23, ML22 and ML23 shown in FIG. 2A and FIG. 4, and the output image blocks, such as the output image blocks MK21-MK23 and MJ21-MJ23. In some embodiments, after the output image blocks are generated and stored, the memory circuit 721 is further configured to transmit the output image blocks to the memory device 710.

In some embodiments, the controlling circuit 723 is configured to control the memory circuit 721 and the processing circuit 722 according to a stage of the CNN modeling processes. For example, after the CNN modeling processes are perform to the image block group MG21 and the image blocks MB28 and MB29, the controlling circuit 723 controls the memory circuit 721 providing the next image block group ML21. For another example, after the CNN modeling processes are perform to the input images IMIN2, the controlling circuit 723 controls the memory circuit 721 receiving the next input images IMIN4. Referring to FIG. 3, FIG. 5 and FIG. 7, the operations OP34 and OP53 are performed by the controlling circuit 723.

Figure 8:
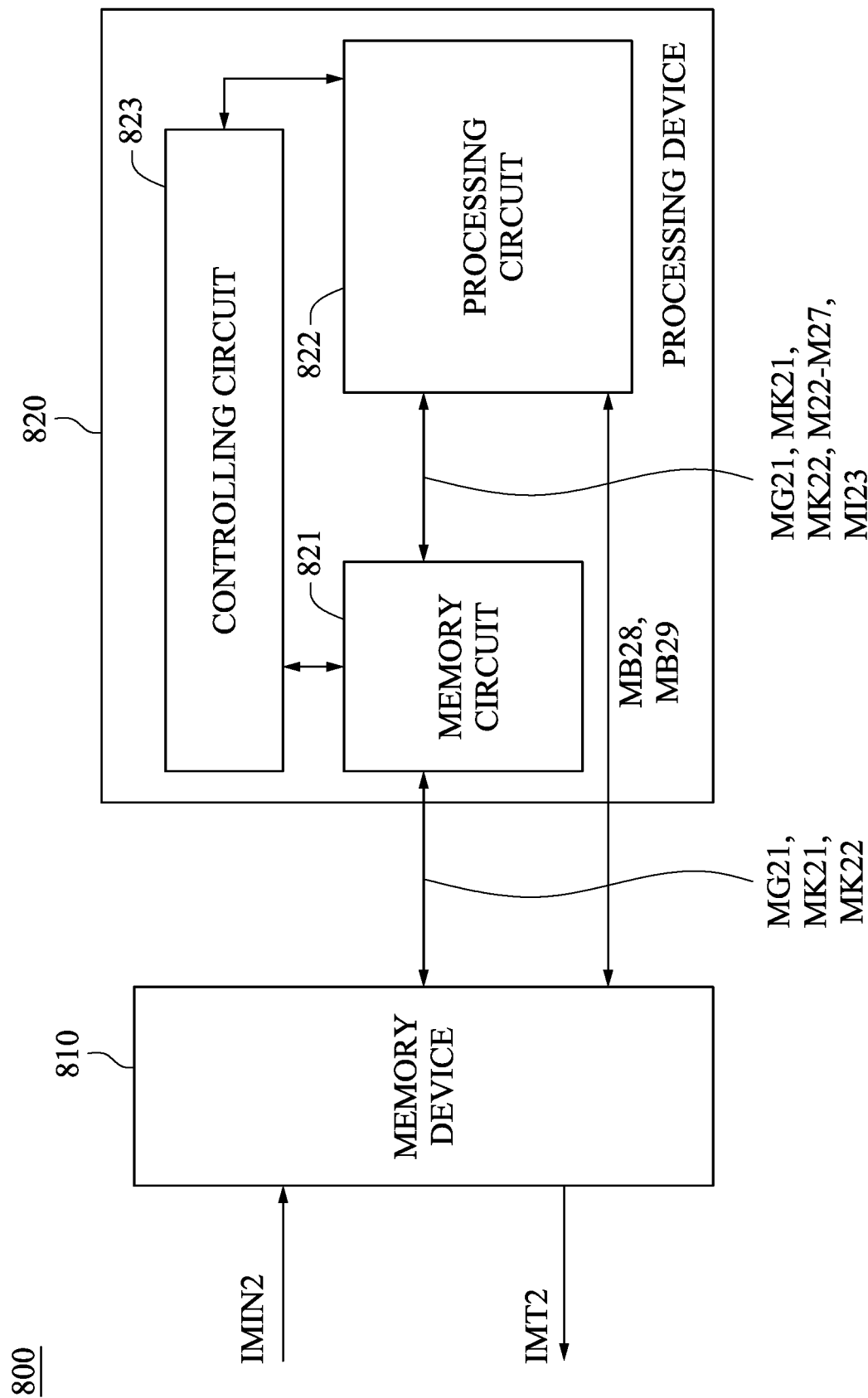
FIG. 8 is a schematic diagram of a system configured to perform the methods and the process shown in FIG. 1 to FIG. 5, in accordance with some embodiments of the present disclosure.

FIG. 8 is a schematic diagram of a system 800 configured to perform the methods 300, 500 and the process 100, 200, 400 shown in FIG. 1 to FIG. 5, in accordance with some embodiments of the present disclosure. In some embodiments, the system 800 includes a memory device 810 and a processing device 820. The processing device 820 includes a memory circuit 821, a processing circuit 822 and a controlling circuit 823.

Referring to FIG. 8 and FIG. 7, the system 800 is an alternative embodiment of the system 700. Operations of the memory device 810, the processing device 820, the memory circuit 821, the processing circuit 822 and the controlling circuit 823 are similar with the memory device 710, the processing device 720, the memory circuit 721, the processing circuit 722 and the controlling circuit 723. Therefore, some descriptions are not repeated, and the discussion will focus more on differences between FIG. 7 and FIG. 8 than on similarities for brevity.

In some embodiments, the processing circuit 822 is configured to receive one of the image block groups from the memory circuit 821 and receive the corresponding image blocks from the memory device 810, to generate corresponding output image blocks.

For example, the processing circuit 822 receives the image block group MG21 from the memory circuit 821 to generate the output image block MK21, and receives the image blocks MB22-MB27 from the memory circuit 821 and the image block MB28 from the memory device 810 to generate the output image block MK22. For further example, the processing circuit 822 receives the image block MB29 from the memory device 810 to generate the output image block MK23.

In some embodiments, the processing circuit 822 receives the intermediate image blocks M22-M27 from the memory circuit 821 and the image block MB28 from the memory device 810 to generate the output image block MK22. In some embodiments, the processing circuit 822 receives the intermediate image blocks M23-M27 and MI23 from the memory circuit 821, and receives the image block MB29 from the memory device 810, to generate the output image block MK23.

Figure 9:
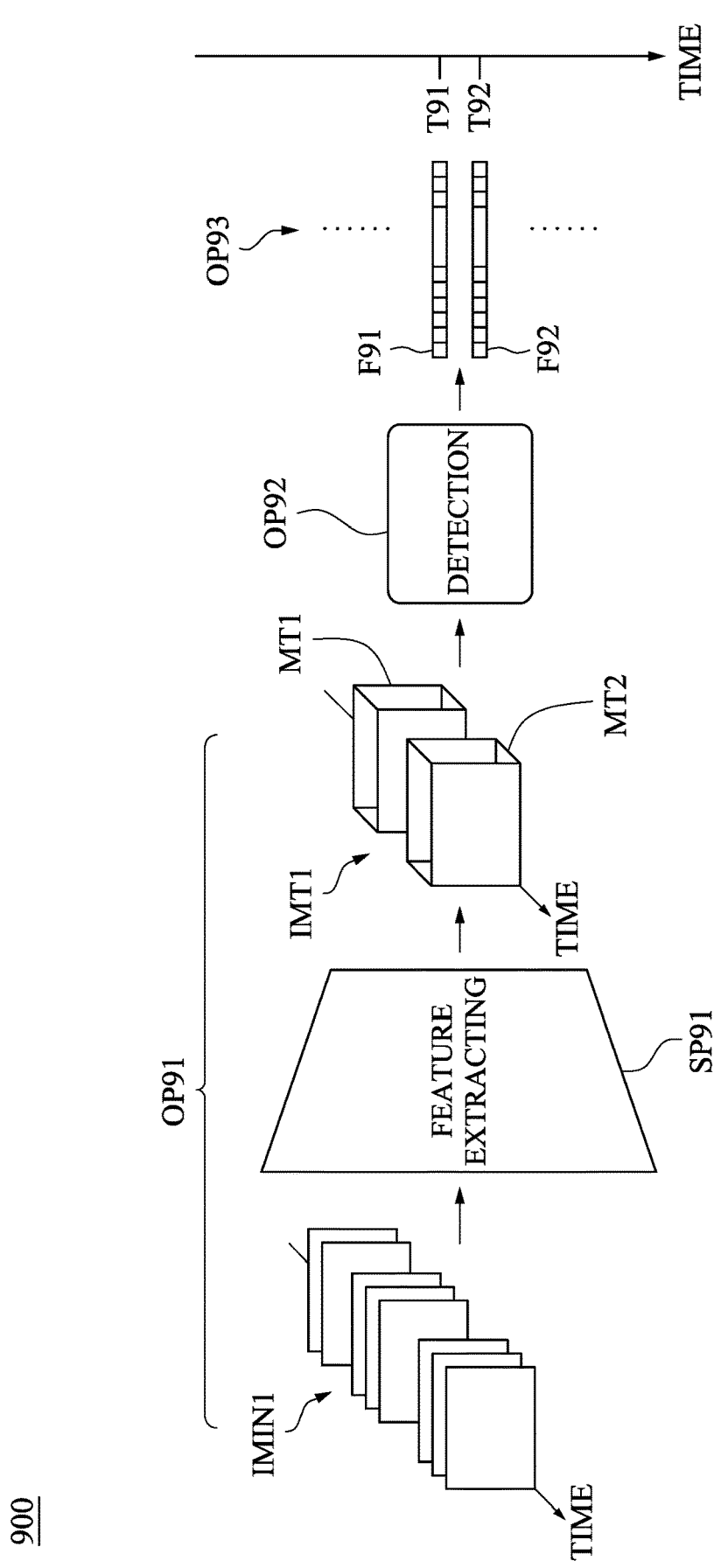
FIG. 9 is a schematic diagram of a CNN process corresponding to the process shown in FIG. 1, in accordance with some embodiments of the present disclosure.

FIG. 9 is a schematic diagram of a CNN process 900 corresponding to the process 100 shown in FIG. 1, in accordance with some embodiments of the present disclosure. In some embodiments, the process 900 includes operations OP91-OP93 performed in order. As illustratively shown in FIG. 9, the operations OP91-OP93 are performed to generate the category vectors F91 and F92 based on the input images IMIN1.

At the operations OP91, the output images IMT1 are generated based on the input images IMIN1. Referring to FIG. 1 and FIG. 9, the operation OP91 is similar with the operations OP11-OP16. As illustratively shown in FIG. 9, the operation OP91 includes an operation SP91 corresponding to the operations OP12 and OP14.

At the operation SP91, the CNN modeling processes are performed to extract features of the input images IMIN1. In some embodiments, the output images IMT1 correspond to feature maps of the input images IMIN1.

At the operation OP92, a detection is performed to the output images IMT1 to generate the category vectors F91 and F92. At the operation OP93, the category vectors F91 and F92 are arranged in order along the time direction. In some embodiments, the category vectors F91 is associated with a moment T91 of the output image MT1, and the category vectors F92 is associated with a moment T92 of the output images MT2.

Also disclosed is a method. The method includes: generating, by a processing device, at least one first output image block based on a first image block group; storing stored image blocks corresponding to a first part of the first image block group in the processing device; and after the at least one first output image block is generated, generating, by the processing device, at least one second output image block based on a first image block and the stored image blocks, wherein the first image block group and the first image block are arranged in order along a first direction, and the at least one first output image block and the at least one second output image block are arranged in order along the first direction.

Also disclosed is a system. The system includes a memory device and a processing device. The memory device is configured to store a number of first input images, and configured to output a first image block group of the number of first input images and a number of first image blocks of the number of first input images in order. The processing device is separated from the memory device, and is configured to generate a first output image block and a second output image block in order. The processing device includes a processing circuit and a memory circuit. The processing circuit is configured to perform a first convolutional neural networks (CNN) modeling process to the first image block group to generate the first output image block, and configured to perform a second CNN modeling process to a first image block of the number of first image blocks and stored image blocks corresponding to a first part of the first image block group to generate the second output image block. The memory circuit is configured to store the stored image blocks, and configured to transmit the first part to the processing circuit.

Also disclosed is a method. The method includes: dividing a number of input images into a number of image block groups and a number of image blocks; and generating a number of first output image blocks in order, including: receiving a number of first image blocks of the number of image blocks in order; generating a first output image block of the number of first output image blocks based on a first image block group of the number of image block groups; and generating a second output image block of the number of first output image blocks based on the first image block group and a first image block of the number of first image blocks. First output image block and the second output image block are arranged in order along a first direction, and the first image block group and the first image block are arranged in order along the first direction.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method, comprising:

generating, by a processing device, at least one first output image block based on a first image block group;

storing a plurality of stored image blocks corresponding to a first part of the first image block group in the processing device;

after the at least one first output image block is generated, generating, by the processing device, at least one second output image block based on a first image block and the plurality of stored image blocks;

dividing a plurality of input images into a plurality of image block groups including the first image block group and a plurality of image blocks including the first image block;

generating at least one third output image block based on a second image block group of the plurality of image block groups; and after the at least one third output image block is generated, generating at least one fourth output image block based on a second image block of the plurality of image blocks and a second part of the second image block group, wherein the first image block group and the first image block are arranged in order along a first direction, and the at least one first output image block and the at least one second output image block are arranged in order along the first direction.

2. The method of claim 1, further comprising:

after the at least one second output image block is generated, generating, by the processing device, the at least one third output image block based on the second image block, the first image block and the second part of the first image block group, wherein the at least one second output image block and the at least one third output image block are arranged in order along the first direction, and the second part is included in the first part.

3. The method of claim 1, further comprising:

after the at least one second output image block is generated, generating, by the processing device, the at least one third output image block based on the second image block group of the plurality of image block groups, wherein the first image block group and the second image block group are arranged in order along a second direction different from the first direction, the at least one first output image block and the at least one third output image block are arranged in order along the second direction.

4. The method of claim 3, further comprising:

storing the second part of the second image block group in the processing device, wherein the first image block and the second image block are arranged in order along the second direction, and the at least one second output image block and the at least one fourth output image block are arranged in order along the second direction.

5. The method of claim 4, further comprising:

after the at least one fourth output image block is generated, generating, by the processing device, at least one fifth output image block based on a third image block of the plurality of image blocks and a third part of the second image block group, wherein the at least one fourth output image block and the at least one fifth output image block are arranged in order along the first direction, the second image block and the third image block are arranged in order along the first direction, and the third part is included in the second part.

6. The method of claim 5, further comprising:

after the at least one second output image block is generated and before the at least one third output image block is generated, generating, by the processing device, at least one sixth output image block based on a fourth image block of the plurality of image blocks and a fourth part of the first image block group, wherein the at least one second output image block and the at least one sixth output image block are arranged in order along the first direction, the fourth image block and the third image block are arranged in order along the second direction, and the fourth part is included in the first part.

7. The method of claim 1, further comprising:

processing the first part by a convolutional neural networks (CNN) modeling process to generate the plurality of stored image blocks;

processing the first image block to generate an intermediate image block; and processing the plurality of stored image blocks and the intermediate image block with a kernel of the CNN modeling process, to generate the at least one second output image block.

8. The method of claim 1, further comprising:

displaying a second image block of the first image block group, the at least one first output image block, a third image block of the first image block group and the at least one second output image block in order, wherein the second image block and the third image block are arranged in order along the first direction, and the first part does not include the second image block.

9. A system comprising:

a memory device configured to store a plurality of first input images, and configured to output a first image block group of the plurality of first input images and a plurality of first image blocks of the plurality of first input images in order;

a processing device being separated from the memory device, and configured to generate a first output image block and a second output image block in order, the processing device comprising:

a processing circuit configured to perform a first convolutional neural networks (CNN) modeling process to the first image block group to generate the first output image block, and configured to perform a second CNN modeling process to a first image block of the plurality of first image blocks and a plurality of stored image blocks corresponding to a first part of the first image block group to generate the second output image block; and a memory circuit configured to store the plurality of stored image blocks, and configured to transmit the plurality of stored image blocks to the processing circuit, wherein the memory device is further configured to provide a second image block group of the plurality of first input images and a plurality of second image blocks of the plurality of first input images in order, after the second output image block is generated, and the processing circuit is further configured to perform a third CNN modeling process to the second image block group to generate a third output image block, and configured to perform a fourth CNN modeling process to a second image block of the plurality of second image blocks and a second part of the second image block group to generate a fourth output image block.

10. The system of claim 9, wherein the processing circuit is further configured to receive the plurality of first image blocks in order to generate a plurality of first output image blocks in order based on the first part stored in the memory circuit, and the plurality of first output image blocks comprise the first output image block and the second output image block.

11. The system of claim 9, wherein the memory circuit is further configured to store the second part, the third output image block and the fourth output image block are arranged in order along a first direction, and the first output image block and the third output image block are arranged in order along a second direction different from the first direction.

12. The system of claim 11, wherein the processing device further comprises:

a controlling circuit configured to determine whether the plurality of first image blocks are processed by the processing circuit, wherein in response to the plurality of first image blocks being processed by the processing circuit, the processing device is configured to perform the third CNN modeling process, in response to at least one of the plurality of first image blocks not being processed by the processing circuit, the processing circuit is configured to receive a third image block of the plurality of first image blocks which is not processed to generate a fifth output image block, the first output image block and the fifth output image block are arranged in order along the first direction.

13. The system of claim 9, wherein the processing device further comprises:

a controlling circuit configured to determine whether the plurality of first input images are processed by the processing circuit, wherein in response to the plurality of first input images being processed by the processing circuit, the processing circuit is further configured to generate a fifth output image block based on a third image block group of a plurality of second input images, and configured to generate a sixth output image block based on a third image block of the plurality of second input images and the third image block group, the plurality of first input images and the plurality of second input images are arranged in order along a first direction, the first image block group, the first image block, the second image block group and the second image block are arranged in order along the first direction, and the first output image block, the second output image block, the third output image block and the fourth output image block are arranged in order along the first direction.

14. The system of claim 9, wherein the processing circuit is further configured to perform the first CNN modeling process to the first part to generate the plurality of stored image blocks, and configured to process the first image block and the plurality of stored image blocks with at least one kernel of the first CNN modeling process, to generate the second output image block.

15. A method, comprising:

dividing a plurality of input images into a plurality of image block groups and a plurality of image blocks; and generating a plurality of first output image blocks in order, comprising:

receiving a plurality of first image blocks of the plurality of image blocks in order;

generating a first output image block of the plurality of first output image blocks based on a first image block group of the plurality of image block groups; and generating a second output image block of the plurality of first output image blocks based on the first image block group and a first image block of the plurality of first image blocks;

generating a third output image block of the plurality of first output image blocks based on the first image block group, the first image block, and a second image block of the plurality of first image blocks; and after the plurality of first output image blocks are generated, generating a plurality of second output image blocks in order, comprising:

receiving a plurality of second image blocks of the plurality of image blocks in order; and generating a fourth output image block of the plurality of second output image blocks based on a second image block group of the plurality of image block groups, wherein the first output image block and the second output image block are arranged in order along a first direction, and the first image block group and the first image block are arranged in order along the first direction.

16. The method of claim 15, further comprising:

displaying a first input image of the plurality of input images, the first output image block, a second input image of the plurality of input images and the second output image block in order, wherein the first input image, the second input image and the first image block are arranged in order along the first direction.

17. The method of claim 15, wherein the second output image block and the third output image block are arranged in order along the first direction, and the first image block and the second image block are arranged in order along the first direction.

18. The method of claim 17, wherein the first image block group and the second image block group are arranged in order along a second direction different from the first direction, and the first output image block and the fourth output image block are arranged in order along the second direction.

19. The method of claim 18, wherein generating the plurality of second output image blocks further comprises:

generating a fifth output image block of the plurality of second output image blocks based on the second image block group and a third image block of the plurality of second image blocks, wherein the fourth output image block and the fifth output image block are arranged in order along the first direction, the second output image block and the fifth output image block and are arranged in order along the second direction, and the first image block and the third image block and are arranged in order along the second direction on a first input image of the plurality of input images.

20. The method of claim 15, wherein generating the first output image block comprises:

performing a convolutional neural networks (CNN) modeling process to the first image block group, to generate a plurality of intermediate image blocks, and generating the second output image block comprises:

processing the first image block and the plurality of intermediate image blocks with at least one kernel of the CNN modeling process, to generate the second output image block.

* * * * *